United States Patent
Yoshidome et al.

(10) Patent No.: US 6,345,642 B1
(45) Date of Patent: Feb. 12, 2002

(54) METHOD AND APPARATUS FOR REMOVING PROCESSING LIQUID FROM A PROCESSING LIQUID PATH

(75) Inventors: Ted G. Yoshidome, Oakland; Tushar Mandrekar; Nitin Khurana, both of Santa Clara; Anish Tolia, San Jose, all of CA (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 09/252,716

(22) Filed: Feb. 19, 1999

(51) Int. Cl.$^7$ .............................. B08B 3/04; B08B 5/00; B08B 9/032
(52) U.S. Cl. ...................... 137/240; 134/95.1; 134/95.2; 134/98.1; 134/99.1; 134/166 C; 134/169 C; 134/171; 137/15.04; 137/565.29; 137/597; 137/884
(58) Field of Search .................. 137/240, 884, 137/597, 565.01, 565.29, 15.04; 134/166 C, 169 C, 95.1, 95.2, 98.1, 99.1, 171

(56) References Cited

U.S. PATENT DOCUMENTS

| | | | | |
|---|---|---|---|---|
| 4,169,486 A | * | 10/1979 | Otteman et al. | 137/240 |
| 4,383,547 A | * | 5/1983 | Lorenz et al. | 137/240 |
| 4,554,942 A | * | 11/1985 | Williams et al. | 137/240 |
| 4,869,301 A | * | 9/1989 | Ohmi et al. | 137/240 |
| 4,917,136 A | * | 4/1990 | Ohmi et al. | 137/240 |
| 5,137,047 A | * | 8/1992 | George | 137/240 |
| 5,368,062 A | * | 11/1994 | Okumura et al. | 137/240 |
| 5,727,589 A | * | 3/1998 | Yokogi | 137/240 |
| 5,749,389 A | * | 5/1998 | Ritrosi et al. | 137/240 |
| 5,819,782 A | * | 10/1998 | Itafuji | 137/240 |
| 5,826,607 A | * | 10/1998 | Knutson et al. | 137/597 |
| 5,975,112 A | * | 11/1999 | Ohmi et al. | 137/240 |
| 5,983,933 A | * | 11/1999 | Ohmi et al. | 137/597 |
| 5,992,463 A | * | 11/1999 | Redemann et al. | 137/240 |
| 6,012,478 A | * | 1/2000 | Park | 137/240 |
| 6,035,893 A | * | 3/2000 | Ohmi et al. | 137/597 |
| 6,068,016 A | * | 5/2000 | Manofsky, Jr. et al. | 137/884 |
| 6,152,175 A | * | 11/2000 | Itoh et al. | 137/884 |

* cited by examiner

*Primary Examiner*—George L. Walton
(74) *Attorney, Agent, or Firm*—Dugan & Dugan

(57) ABSTRACT

A valve arrangement is provided that more effectively purges processing liquid from a processing liquid delivery system. With the valve arrangement only a small portion of the processing liquid path having a small wetting perimeter must be purged to affect replacement of a dysfunctional injection valve or any other component within the processing liquid delivery system. The valve arrangement comprises a first and a second isolation valve, a pump valve and purge valve configured to reduce the wetting perimeter defined by the four valves. The valve arrangement allows a dysfunctional injection valve or any other component to be replaced without health risk to humans or damage risk to a processing liquid delivery system employing the valve arrangement. During component replacement, the first and the second isolation valves are closed and the pump and the purge valves are opened so as to purge processing liquid from the isolated volume defined by the four valves. Pump/purge cycles preferably are performed, and the purging process may be performed automatically or manually. Once the isolated volume is purged, one of the isolation valves and the component are removed and replaced as a unit.

27 Claims, 4 Drawing Sheets

METHOD AND APPARATUS FOR REMOVING PROCESSING LIQUID FROM A PROCESSING LIQUID PATH

FIELD OF THE INVENTION

The present invention relates to processing liquid delivery systems for processing chambers, and more specifically to the removal of processing liquid from a processing liquid path of a processing liquid delivery system.

BACKGROUND OF THE INVENTION

Many semiconductor processes such as chemical vapor deposition (CVD) employ vaporized processing liquids. These vaporized processing liquids are generated and supplied to a processing chamber via a processing liquid delivery system comprising an interconnection of pipes, valves, flow regulators and vaporizing mechanisms. Typically a separate vaporizing mechanism is provided for vaporizing each processing liquid, and is coupled to a source of processing liquid and a source of carrier gas. Although a number of vaporizing mechanisms exist (e.g., bubblers, injection valves, etc.), most conventional processing liquid delivery systems employ a plurality of injection valves for vaporizing processing liquids to be delivered to a processing chamber.

A typical injection valve comprises a processing liquid inlet for receiving a pressurized processing liquid, a carrier gas inlet for receiving a pressurized inert carrier gas, and an outlet for delivering a vaporized processing liquid/carrier gas mixture. The injection valve is heated such that when the processing liquid is injected into the carrier gas, the heat and the low partial vapor pressure of the processing liquid in the carrier gas cause the processing liquid to vaporize.

Over time injection valves can fail (e.g., due to mechanical failure) or clog (e.g., due to deposit formation within the injection valve from the interaction of processing liquid with other processing chemicals or with the injection valve itself) and must be replaced. However, the process of injection valve replacement is complicated when the processing liquid vaporized by the injection valve reacts deleteriously with air (e.g., moisture, oxygen, etc.) to form by-products (e.g., solid films such as oxides) that can damage the processing liquid delivery system or the processing chamber, contaminate subsequently processed semiconductor wafers or harm humans or the environment (e.g., toxic).

To prevent deleterious processing liquid formation during injection valve replacement, if possible, processing liquid is purged from all processing liquid paths exposed to atmosphere when the injection valve is removed. The processing liquid purging process, however, is difficult within conventional processing liquid delivery systems when processing liquids with strong adhesive properties such as metal-organics (e.g., tetrakis(dimethylamino)titanium (TDMAT)) must be purged from processing liquid paths, as described with reference to FIG. 1.

FIG. 1 is a schematic view of a conventional processing liquid delivery system 11 ("conventional system 11") for delivering vaporized processing liquid to a processing chamber (not shown). The conventional system 11 comprises a source of processing liquid 13 operatively coupled (i.e., coupled either directly or indirectly so as to operate) to an injection valve 15 via a processing liquid path 17. Note that the processing liquid path 17 is shown broken to indicate that the source of processing liquid 13 may be a substantial distance (e.g., up to about 1–15 feet) from the injection valve 15.

Disposed along and forming a part of the processing liquid path 17 are a first isolation valve 19, a second isolation valve 21, a liquid flow meter 23 and a third isolation valve 25. The first isolation valve 19 is positioned near the source of processing liquid 13, the third isolation valve 25 is positioned near the injection valve 15, the liquid flow meter 23 is positioned near the third isolation valve 25 and the second isolation valve 21 is positioned near the liquid flow meter 23 as shown. A large number of other isolation valves typically are present along the processing liquid path 17 but are omitted for clarity.

The conventional system 11 also comprises a source of purging gas 27 (e.g., nitrogen, argon, or some other gas which does not react with the processing liquid) operatively coupled to the processing liquid path 17 via a purging gas line 29, and a pump 31 (e.g., a mechanical vacuum pump) operatively coupled to the processing liquid path 17 via a pump line 33. Disposed along and forming a part of the purging gas line 29 is a purge valve 35, and disposed along and forming a part of the pump line 33 is a pump valve 37.

During normal operation of the conventional system 11, the first isolation valve 19, the second isolation valve 21 and the third isolation valve 25 are open to allow processing liquid to flow from the source of processing liquid 13 to the injection valve 15 at a rate controlled by the liquid flow meter 23. The purge valve 35 and the pump valve 37 are closed to prevent processing liquid from being purged by the source of purging gas 27 and from being pumped by the pump 31.

If the injection valve 15 subsequently becomes damaged, defective, clogged or otherwise unusable (i.e., dysfunctional) and must be replaced, the injection valve 15 is isolated from the source of processing liquid 13 by closing the first isolation valve 19. Assuming the processing liquid is a metal-organic substance such as TDMAT or (Trimethylvinylsilyl)hexafluoro-acetylacetonato Copper 1 (CupraSelect®), the injection valve 15 cannot be directly disconnected from the conventional system 11 without posing a substantial health risk to the technician removing the injection valve 15 and without posing a substantial damage risk to the conventional system 11. TDMAT, for instance, reacts with moisture in the air to form by-products that are harmful to humans (e.g., amines) and solid films (e.g., oxides) that will contaminate the entire conventional system 11. Processing liquid, therefore, must be purged from the processing liquid path 17 prior to removing the injection valve 15.

To purge processing liquid from the processing liquid path 17, with the first isolation valve 19 closed and the second isolation valve 21 and the third isolation valve 25 open, the purge valve 35 and the pump valve 37 are opened. Purging gas thereby flows from the source of purging gas 27, through the purging gas line 29, through the processing liquid path 17 and through the pump line 33 to the pump 31. The purging gas dislodges absorbed processing liquid molecules from the surfaces of the processing liquid path 17, and the dislodged particles are pumped from the processing liquid path 17 via the pump 31. Pump/purge cycles (wherein the purge valve 35 is closed for a time period while the pump 31 continues to pump processing liquid and purging gas from the processing liquid path 17, followed by a time period wherein the purge valve 35 is opened so as to introduce more purging gas to the processing liquid path 17) may be performed to aid in processing liquid removal from the processing liquid path 17.

For processing liquids having strong adhesive properties (e.g., metal-organics), the pump/purge process described above is largely ineffective at removing processing liquid from the processing liquid path 17 to a level sufficient to prevent deleterious by-product formation when the injection valve 15 is removed from the conventional system 11. This is particularly true for TDMAT.

One approach to improving the purging effectiveness of the conventional system 11 is to employ a "flushing liquid" during purging that reduces the adhesive properties of the processing liquid. For instance, hexane may be employed to improve the purging of TDMAT from a processing liquid path.

Flushing liquids, however, typically are expensive and often possess undesirable properties. Hexane, for example, is flammable and requires special handling procedures that increase the operating costs of processing liquid delivery systems employing hexane-assisted purging.

Accordingly, a need exists for a processing liquid purging method and apparatus that more effectively purges a processing liquid from a processing liquid delivery system without requiring the additional expense and/or safety considerations associated with the use of flushing liquids.

SUMMARY OF THE INVENTION

To address the needs of the prior art, a novel valve arrangement is provided that allows for more effective purging of processing liquid from a processing liquid delivery system. Specifically, with the novel valve arrangement only a small portion of a processing liquid path must be purged of processing liquid to affect replacement of a dysfunctional injection valve. The small portion of the processing liquid path that is purged has a small surface area or "wetting perimeter" that may be effectively purged of processing liquid without the use of a flushing liquid.

The novel valve arrangement comprises a first isolation valve disposed near the liquid flow meter of the processing liquid delivery system, a second isolation valve disposed between the source of processing liquid and the first isolation valve, a purge valve disposed between the first and the second isolation valves and a pump valve disposed between the purge valve and the second isolation valve. Preferably each valve is configured to reduce the wetting perimeter of the processing liquid volume defined by the four valves (i.e., the isolated volume). For example, the wetting perimeter of the isolated volume may be reduced by employing valves having either a small wetting perimeter input or output port and by facing the small wetting perimeter port of each valve toward the isolated volume. Preferably there are no tees or other regions within the isolated volume which can not be directly purged with purging gas (i.e., dead legs).

With the novel valve arrangement, a processing liquid delivery system is formed in which a dysfunctional injection valve may be replaced without causing a health risk to humans or a damage risk to the processing liquid delivery system. To replace a dysfunctional injection valve, the first and the second isolation valves are closed and the pump and the purge valves are opened so as to purge processing liquid from the isolated portion of the processing liquid path between the first and the second isolation valves. Pump/purge cycles preferably are employed, and the purging process may be performed manually or automatically via a programmed controller.

Because of the small wetting perimeter of the isolated volume, and the lack of dead legs therein, the isolated portion of the processing liquid path is sufficiently purged of processing liquid to prevent deleterious by-product formation when the isolated portion is exposed to air (i.e., sufficiently purged), even when the purged processing liquid comprises a strongly adhesive metal-organic such as TDMAT. With the isolated portion of the processing liquid path effectively purged, the pump and the purge valves are closed and the first isolation valve, the liquid flow meter and the dysfunctional injection valve are removed as a sealed unit, and no processing liquid is released from either the processing liquid path or the sealed unit. A new (i.e., brand new, different, refurbished or cleaned) first isolation valve, liquid flow meter and injection valve then are connected to the processing liquid delivery system, preferably as a sealed unit, free of moisture or other species that may react with the processing liquid. The new isolated volume formed by the four valves is purged of moisture and other reactive species prior to reintroducing processing liquid thereto, in order to avoid contamination of the processing liquid delivery system. In this manner, processing liquid purging and injection valve replacement are performed more economically and with less health and equipment damage risk. The inventive valve arrangement also may be used to similarly affect replacement of other components within a processing liquid delivery system (e.g., a liquid flow meter, a processing liquid source, a gas source, a pump, a functioning injection valve, etc.).

Other objects, features and advantages of the present invention will become more fully apparent from the following detailed description of the preferred embodiments, the appended claims and the accompanying drawings.

DETAILED DESCRIPTION OF THE PREFERRED EMBODIMENTS

Figure 1:
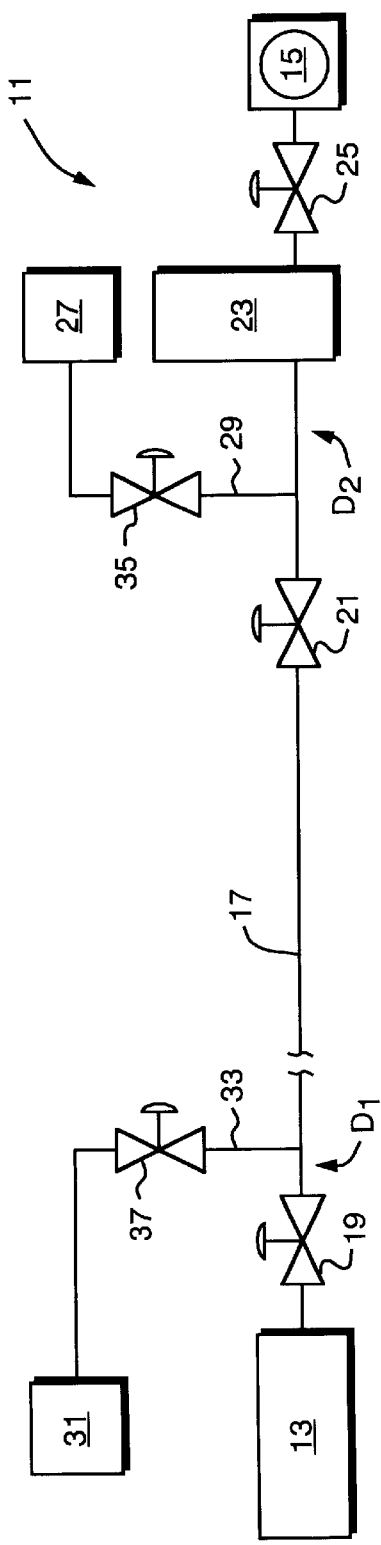
FIG. 1 is a schematic view of a conventional processing liquid delivery system as previously described.
Figure 2:
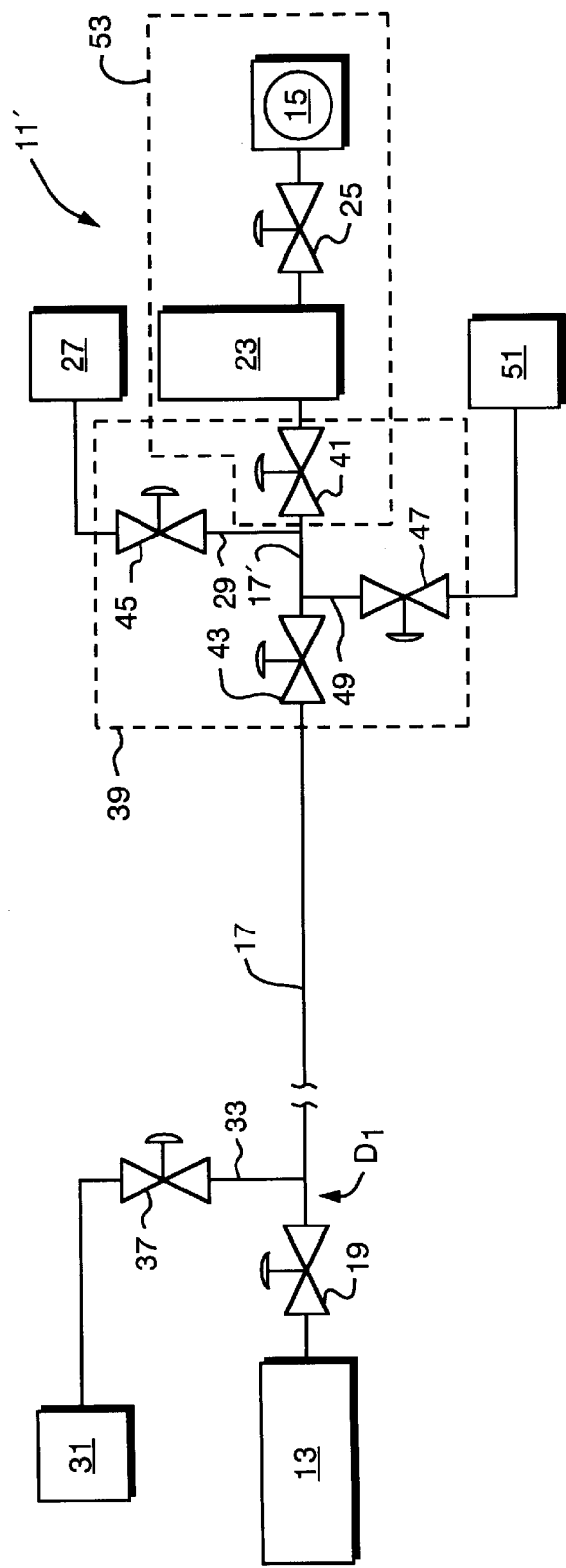
FIG. 2 is a schematic view of an inventive processing liquid delivery system employing an inventive valve arrangement in accordance with the present invention.

FIG. 2 is a schematic view of an inventive processing liquid delivery system 11' ("inventive system 11'") configured in accordance with the present invention. Specifically, as shown in FIG. 2, the inventive system 11' comprises the source of processing liquid 13, the injection valve 15, the processing liquid path 17, the first isolation valve 19, the liquid flow meter 23, the third isolation valve 25, the source of purging gas 27, the purging gas line 29, the pump 31, the pump line 33 and the pump valve 37 of FIG. 1, plus an inventive "short-path" valve arrangement 39.

The short-path valve arrangement 39 comprises a first "short-path" isolation valve 41 disposed along and forming a part of the processing liquid path 17 near the liquid flow meter 23, and a second "short-path" isolation valve 43 disposed along and forming a part of the processing liquid path 17 a short distance (e.g., center line to center line of 1.0 to 1.5 inches) from the first short-path isolation valve 41 in a direction toward the source of processing liquid 13. The short-path valve arrangement 39 further comprises a "short-path" purge valve 45 operatively coupled to the processing liquid path 17 via the purging gas line 29 disposed between the first short-path isolation valve 41 and the second short-path isolation valve 43, and a "short-path" pump valve 47 operatively coupled to the processing liquid path 17 via a second pump line 49 which extends between the second short-path isolation valve 43 and the short-path purge valve 45. A "short-path" pump 51 is operatively coupled to the short-path pump line 49 as shown. The pumps 31 and 51 may be the same pump if desired.

During normal operation of the inventive system 11', the first isolation valve 19, the third isolation valve 25, the first short-path isolation valve 41 and the second short-path isolation valve 43 are open to allow processing liquid to flow from the source of processing liquid 13 to the injection valve 15 at a rate controlled by the liquid flow meter 23. The pump valve 37, the short-path purge valve 45 and the short-path pump valve 47 are closed to prevent processing liquid from being purged by the source of purging gas 27 and to prevent processing liquid from being pumped by the pump 31 and the short-path pump 51. Thus during normal operation the inventive system 11' functions similarly to the conventional system 11 of FIG. 1.

The main advantages of the inventive system 11' are realized when the injection valve 15 becomes dysfunctional and must be replaced, and are best understood with reference to both the conventional system 11 of FIG. 1 and the inventive system 11' of FIG. 2. Recall that for the conventional system 11 of FIG. 1, the injection valve 15 is replaced by purging the processing line 17 of processing liquid and by then replacing the dysfunctional injection valve 15. Specifically, during processing liquid purging the injection valve 15 is isolated from the source of processing liquid 13 by closing the first isolation valve 19, and the processing liquid path 17 is purged (via the source of purging gas 27 and the pump 31) by flowing purging gas from the source of purging gas 27, through the purging gas line 29, through the processing liquid path 17 and through the pump line 33 to the pump 31. The injection valve 15 then is detached from the processing liquid path 17. As stated, this conventional purging process is ineffective at removing enough processing liquid from the processing liquid path 17 to prevent deleterious by-product formation if a processing liquid having strong adhesive properties (e.g., a metal-organic) is employed.

The main reasons for ineffective processing liquid purging within the conventional system 11 of FIG. 1 are: (1) the large wetting perimeter (i.e., surface area in contact with the processing liquid) between the injection valve 15 and the pump 31 that must be purged of processing liquid; and (2) the portions of the processing liquid path 17 that cannot be directly purged with purging gas (e.g., the dead leg volumes). The two largest dead legs in the conventional system 11 are the dead leg $D_1$ between the first isolation valve 19 and the location where the pump line 33 couples to the processing liquid path 17, and the dead leg $D_2$ between the injection valve 15 and the location where the purging gas line 29 couples to the processing liquid path 17. Neither the dead leg $D_1$ nor the dead leg $D_2$ can be directly purged with purging gas during purging of the conventional system 11. To replace the injection valve 15 of the inventive system 11' of FIG. 2, purging of processing liquid from a large wetting perimeter or from large dead legs is not required (as described below).

To replace the injection valve 15 of the inventive system 11' once the injection valve 15 becomes dysfunctional, the first short-path isolation valve 41 and the second short-path isolation valve 43 are closed so that the first short-path isolation valve 41, the liquid flow meter 23, the third isolation valve 25 and the dysfunctional injection valve 15 may be removed and replaced as a sealed unit 53 (e.g., with one end of the unit 53 sealed by closing the first short-path isolation valve 41 and the other end of the unit 53 sealed by the dysfunctional injection valve 15). If the dysfunctional injection valve is clogged, the clog seals the injection valve end of the unit 53; otherwise the injection valve 15 may be closed to seal the injection valve end of the unit 53.

The first short-path isolation valve 41 and the second short-path isolation valve 43 define a small portion 17' (e.g., between the two valves 41, 43) of the processing liquid path 17 when closed. Thereafter, the small portion 17' of the processing liquid path 17, the portion of the purging gas line 29 between the processing liquid path 17 and the short-path purge valve 45, and the portion of the short-path pump line 49 between the processing liquid path 17 and the short-path pump valve 47, are purged of processing liquid by opening the short-path purge valve 45 and the short-path pump valve 47. Pump/purge cycles preferably are employed during purging.

Because of the small wetting perimeter of the small portion 17' of the processing liquid path 17 and the lack of significant dead legs therein (e.g., the dead leg $D_2$ of FIG. 1 does not exist and the dead leg $D_1$ has no affect because the dead leg $D_1$ is outside the portion 17'), the small portion 17' may be rapidly purged of processing liquid so as to prevent deleterious by-product formation when the sealed unit 53 is removed. Even strongly adhesive metalorganic processing liquids such as TDMAT may be quickly purged from the small portion 17' of the processing liquid path 17. Accordingly, following purging of the small portion 17', the sealed unit 53 is removed from the inventive system 11' and a new sealed unit (not shown) is attached to the inventive system 11'. The new sealed unit preferably is free of moisture or other species that may react with the processing liquid. The isolated volume defined by the valves 41–47 then is purged of moisture and other reactive species (e.g., by purging the small portion 17' of the processing liquid path 17 in the same manner as the previously described processing liquid purging process) prior to introducing processing liquid thereto, so as to avoid contamination of the inventive system 11'.

Figure 3:
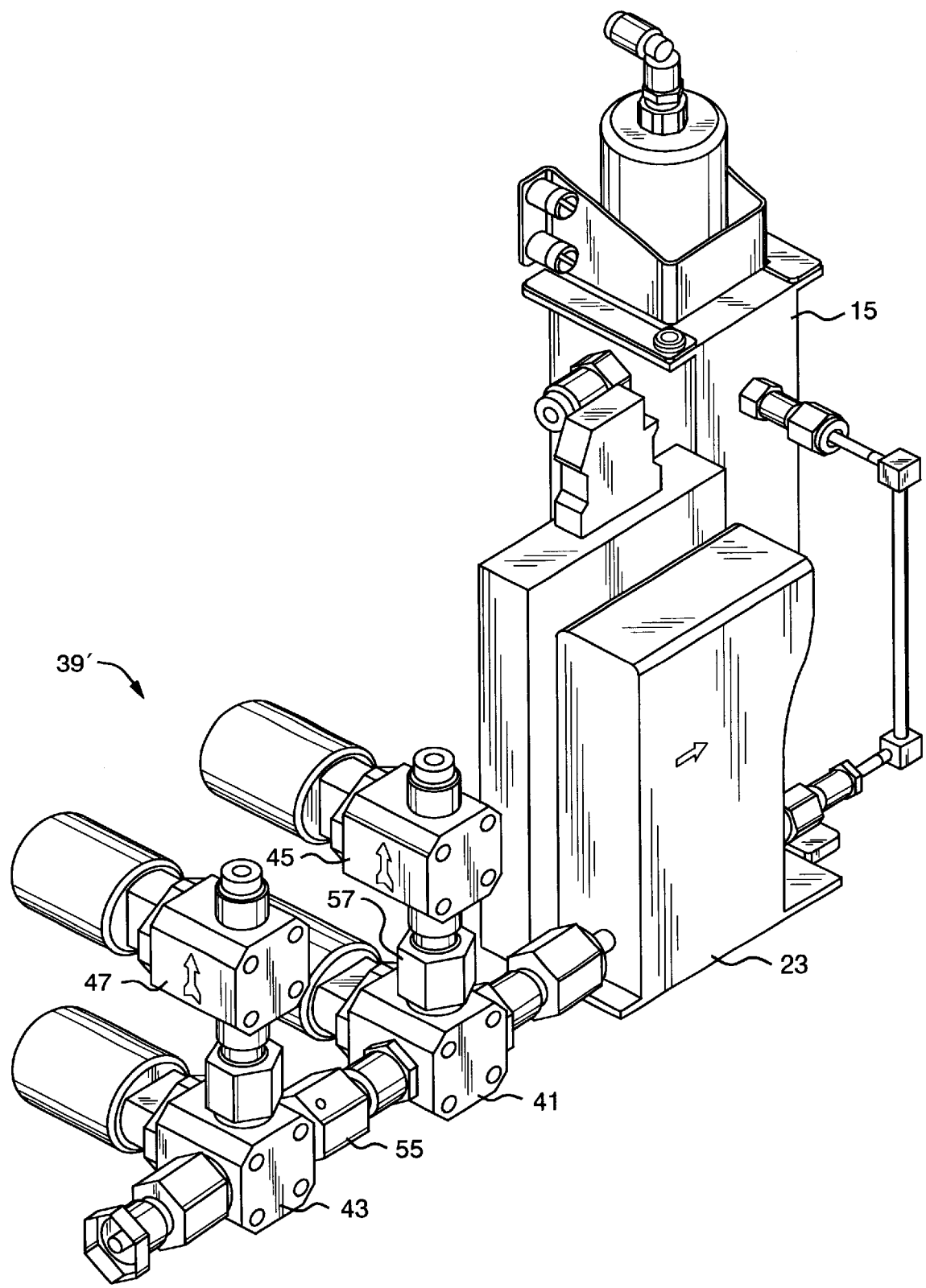
FIG. 3 is a perspective view of the preferred configuration for the inventive valve arrangement of FIG. 2.

FIG. 3 is a perspective view of a preferred configuration 39' for the short-path valve arrangement 39 of FIG. 2, shown operatively coupled to the liquid flow meter 23 and the injection valve 15. The third isolation valve 25 is not shown. The first short-path isolation valve 41, the second short-path isolation valve 43, the short-path purge valve 45 and the short-path pump valve 47 preferably comprise pneumatic valves, and the first and the second short-path isolation valves 41, 43 preferably are 3-way pneumatic valves. The use of 3-way pneumatic valves prevents dead leg formation within the isolated volume defined by the four valves as described below with reference to FIG. 4. A first nut 55 and a second nut 57 are provided between the first short-path isolation valve 41 and the second short-path isolation valve 43 and between the first short-path isolation valve 41 and the short-path purge valve 45, respectively, for easy removal of the sealed unit 53 (FIG. 3), as previously described.

Figure 4:
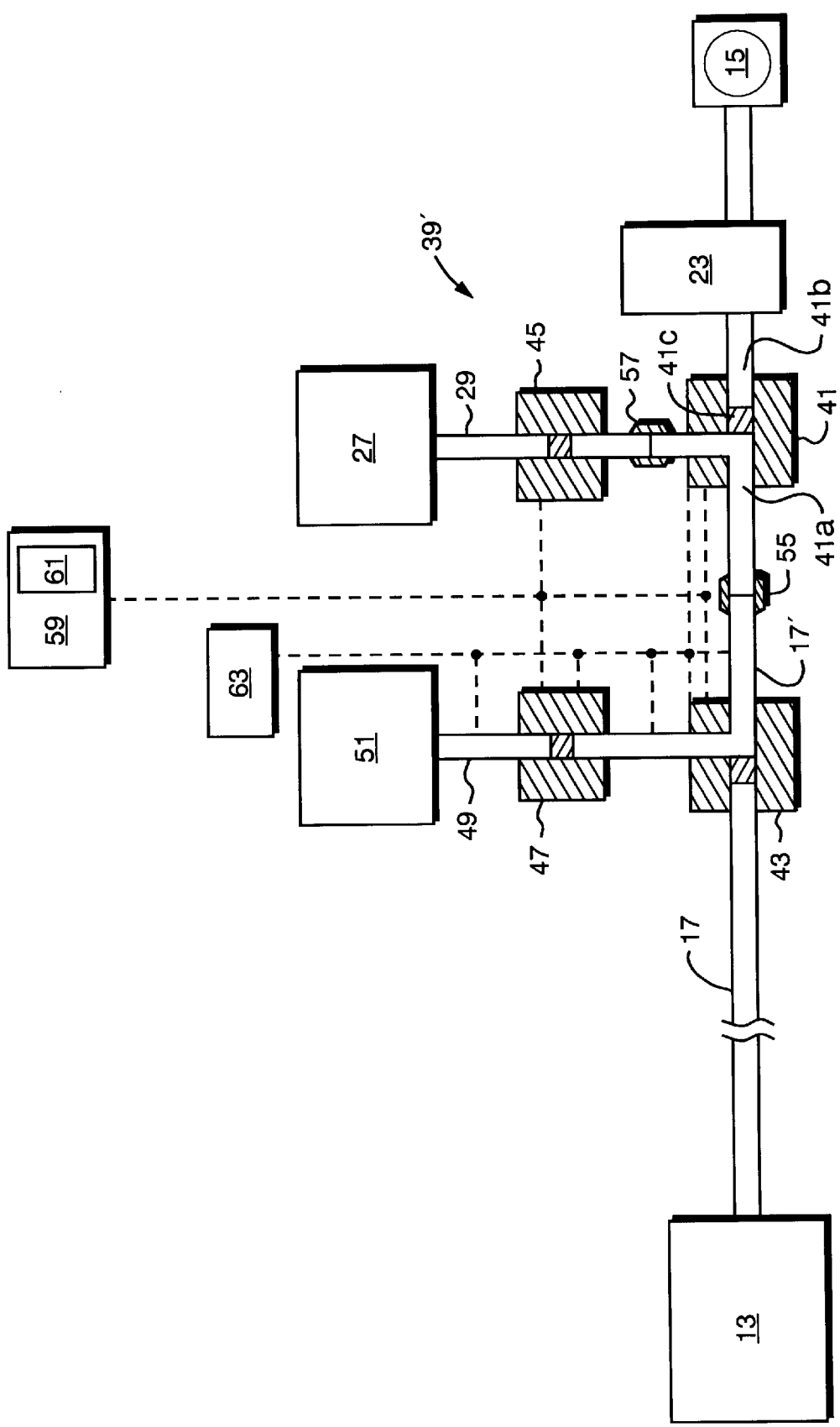
FIG. 4 is a simplified, side elevational view of the preferred valve arrangement of FIG. 3.

FIG. 4 is a simplified, side elevational view of the preferred valve arrangement 39' of FIG. 3 shown operatively coupled to the source of processing liquid 13, to the liquid flow meter 23, to the injection valve 15, to the source of purging gas 27 and to the short-path pump 51. A controller 59 is operatively coupled to each valve 41–47 and has a memory 61 that contains a program for controlling the operation of the valves 41–47 as previously described. A heater 63 also is coupled to the valves 41, 43 and 47, to the small portion 17' of the processing liquid path 17 and to the short-path pump line 49 as shown.

Each valve 41–47 of the preferred valve arrangement 39' is configured so as to reduce the wetting perimeter of the isolated volume defined by the four valves. Specifically, the valves 41–47 are selected to have either a small wetting perimeter input or output port, and the small perimeter port side of the valve is faced toward the isolated volume defined by the four valves. For instance, the first short-path isolation valve 41 is shown having a first section 41a (e.g., an input port), a second section 41b (e.g., an output port) and an isolating mechanism 41c between the first section 41a and the second section 41b. The isolating mechanism 41c has an open position for allowing the flow of processing liquid between the first and the second sections 41a, 41b and a closed position for preventing processing liquid flow therebetween. The first section 41a has a much smaller wetting perimeter than the second section 41b and therefore is faced toward the second short-path isolation valve 43. The valves 43–47 are similarly configured (as shown).

Note that the first and the second short-path isolation valves 41, 43 comprise 3-way pneumatic valves. The use of the 3-way pneumatic valves 41, 43 virtually eliminates any dead legs within the isolated volume defined by the valves 41–47 because the purging gas line 29 and the short-path pump line 49 can be located at the ends of the small portion 17' (e.g., adjacent the isolation mechanisms of the first and the second short-path isolation valves 41, 43, respectively), further increasing the ease with which processing liquid may be purged therefrom.

To replace a dysfunctional injection valve 15 employing the controller 59, the program residing in the memory 61 is executed. The program directs the controller 59 to close the first short-path isolation valve 41 and the second short-path isolation valve 43 so as to isolate the injection valve 15 from the small portion 17' of the processing liquid path 17. Thereafter the program directs the controller 59 to open the short-path purge valve 45 and the short-path pump valve 47 so as to purge processing liquid from the small portion 17' of the processing liquid path 17. Because of the small volume of processing liquid to be purged and the lack of any dead legs, processing liquid is rapidly removed from the small portion 17' of the processing liquid path 17, from the portion of the purging gas line 29 between the processing liquid path 17 and the short-path purge valve 45 and from the portion of the short-path pump line 49 between the small portion of the processing liquid path 17' and the short-path pump valve 47. The program preferably directs the controller 59 to execute several pump/purge cycles by opening and closing the short-path purge valve 45 as previously described. The number of pump/purge cycles performed is determined by monitoring the rate of rise within the small portion 17' of the processing liquid path 17 or by trial and error.

Following processing liquid purging, the program directs the controller 59 to close both the short-path purge valve 45 and the short-path pump valve 47. An operator then loosens the first nut 55 and the second nut 57, and removes the sealed unit 53 (FIG. 2). Thereafter, a new sealed unit (not shown) is provided. Once the new sealed unit is in place, the small portion 17' of the processing liquid path 17 is purged of moisture (e.g., air) and other reactive species via the short-path pump 51 and/or the source of purging gas 27 prior to reintroducing processing liquid to the small portion 17' of the processing liquid path 17.

To further improve processing liquid purging from the short-path valve arrangement 39', the first short-path isolation valve 41, the second short-path isolation valve 43, the short-path pump valve 47, the small portion 17' of the processing liquid path 17 and the short-path pump line 49 preferably are heated to a temperature of about 70 to 80° C. via the heater 63 during processing liquid purging. The heater 63 may comprise heat trace, heater rods, flexible silicon rubber heaters, custom form fitting heaters or the like as are well known in the art.

Heating one or more of the above-listed components of the short-path valve arrangement 39' provides additional energy for desorption of processing liquid from the various surfaces within the valve arrangement 39', which, in conjunction with the pump/purge cycles described herein, results in highly effective processing liquid purging. A heated purge gas may be similarly employed to impart thermal energy to the processing liquid if desired.

In addition to thermal energy sources, non-thermal energy sources may be used to impart energy to processing liquid within the short-path valve arrangement 39' to aid in processing liquid desorption. Suitable non-thermal energy sources are described in commonly assigned U.S. patent application Ser. No. 09/252,717, filed Feb. 19, 1999 (AMAT No. 3223/IMS/DV) which is hereby incorporated by reference herein in its entirety. Both thermal and non-thermal sources also may be employed to improve processing liquid purging within the short-path valve arrangement 39 of FIG. 2 and within the short-path valve arrangement 39" of FIG. 5 (described below), and the controller 59 may be programmed to control the heater 63.

Figure 5:
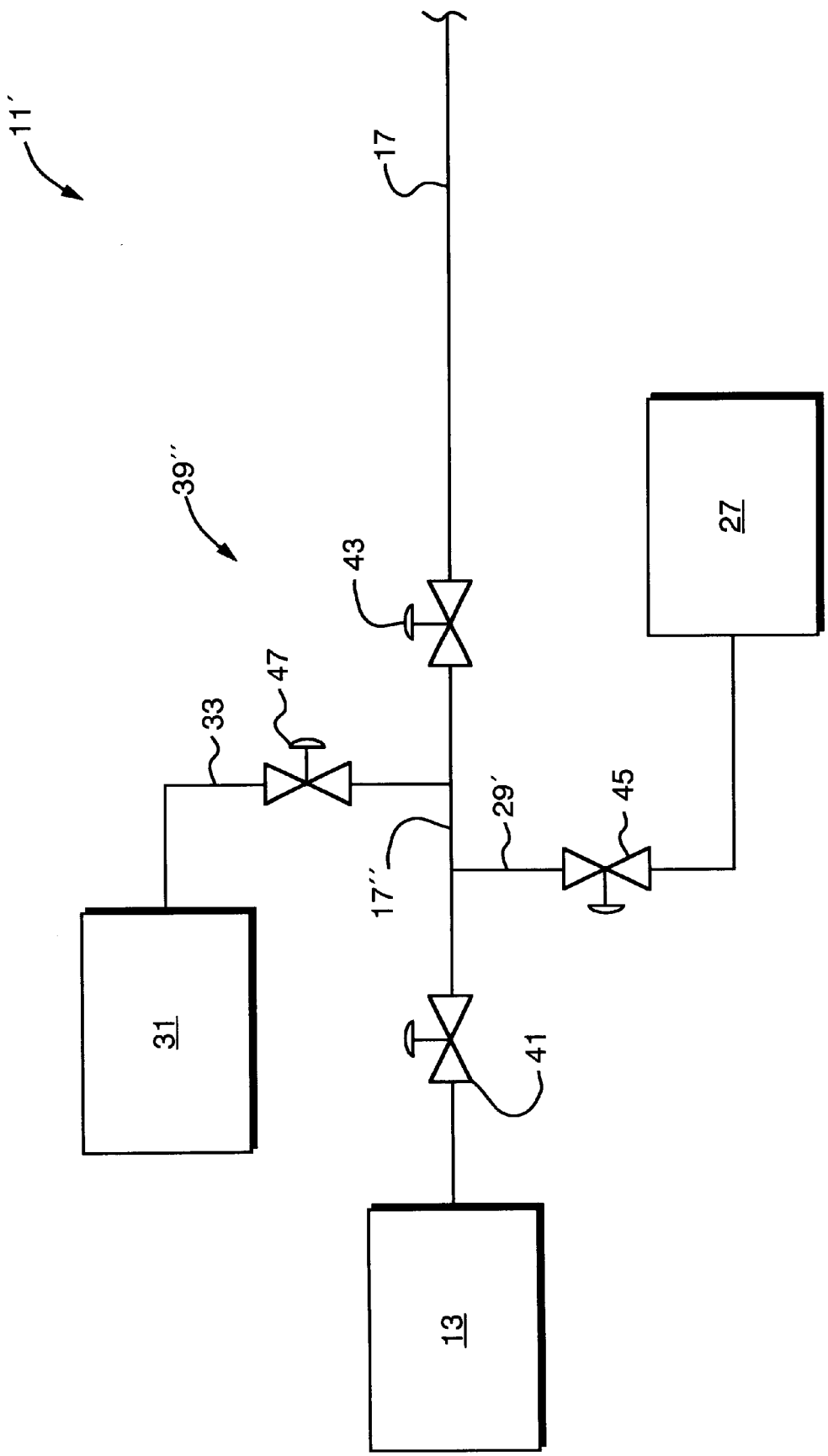
FIG. 5 is a schematic view of an additional inventive processing liquid delivery system employing an inventive valve arrangement in accordance with the present invention.

FIG. 5 is a schematic view of the inventive processing liquid delivery system 11' employing an additional inventive short-path valve arrangement 39" (additional valve arrangement 39") configured for removing the source of processing liquid 13 from the inventive system 11'. The additional valve arrangement 39" comprises the first "short-path" isolation valve 41 disposed along and forming a part of the processing liquid path 17 near the source of processing liquid 13, and the second "short-path" isolation valve 43 disposed along and forming a part of the processing liquid path 17 a short distance (e.g., center line to center line of 1.0 to 1.5 inches) from the first short-path isolation valve 41 in a direction toward the liquid flow meter 23 (not shown).

The additional valve arrangement 39" further comprises the "short-path" purge valve 45 operatively coupled to the processing liquid path 17 via an additional purging gas line 29' disposed between the first short-path isolation valve 41 and the second short-path isolation valve 43, and the "short-path" pump valve 47 operatively coupled to the processing liquid path 17 via the pump line 33. The source of purging gas 27 is operatively coupled to the short-path purge valve 45 and the pump 31 is operatively coupled to the short-path pump valve 47.

The additional valve arrangement 39" may be used during the replacement of the source of processing liquid 13, the pump 31 or the source of purging gas 27 in a manner similar to the way in which the valve arrangement 39 of FIG. 2 is used during the replacement of the dysfunctional injection valve 15 (as previously described). For instance, to replace the source of processing liquid 13, the first short-path isolation valve 41 is closed so that the first short-path isolation valve 41 and the source of processing liquid 13 may be removed and replaced as a sealed unit. After the first short-path isolation valve 41 is closed, the second short-path isolation valve 43 is closed to define a small portion 17" of the processing liquid path 17 between the two valves 41, 43. Thereafter, the small portion 17" of the processing liquid path 17, the portion of the purging gas line 29' between the processing liquid path 17 and the short-path purge valve 45, and the portion of the pump line 33 between the processing liquid path 17 and the short-path pump valve 47, are purged of processing liquid by opening the short-path purge valve 45 and the short-path pump valve 47 as previously described.

Once the small portion 17" of the processing liquid path 17 is sufficiently purged of processing liquid, the source of processing liquid 13 and the first short-path isolation valve 41 are removed and replaced as a sealed unit (e.g., in a manner similar to the removal and replacement of the sealed unit 53 of FIG. 2). Exposure of processing liquid to atmosphere and the deleterious consequences thereof thereby are avoided. The pump 31 and the source of purging gas 27 may be similarly removed and replaced.

The foregoing description discloses only the preferred embodiments of the invention, modifications of the above disclosed apparatus and method which fall within the scope of the invention will be readily apparent to those of ordinary skill in the art. For instance, any type of isolation valve may be employed for the valves 41–47, and any non-reactive gas (e.g., nitrogen) may be used to purge processing liquid from the small portion 17' of the processing liquid path 17. Further, any number of components may form the sealed unit 53. The controller 59 also may control the operation of the source of processing liquid 13, of the liquid flow meter 23, of the injection valve 15, of the source of purging gas 27, of the short-path pump 51 and of any other components within the inventive system 11' or within a processing apparatus connected thereto.

Accordingly, while the present invention has been disclosed in connection with the preferred embodiments thereof, it should be understood that other embodiments may fall within the spirit and scope of the invention, as defined by the following claims.

The invention claimed is:

1. A valve arrangement adapted to purge a processing liquid path comprising:
   a processing liquid path adapted to transport processing liquid between a source of the processing liquid and a liquid flow meter;
   a first isolation valve located adjacent an upstream side of the flow meter and forming a first part of the processing liquid path;
   a second isolation valve located upstream from the first isolation valve and forming a second part of the processing liquid path;
   a purge valve operatively coupled to the processing liquid path between the first and the second isolation valves and adapted to operatively couple to a source of purging gas; and
   a pump valve operatively coupled to the processing liquid path between the first and the second isolation valves and adapted to operatively couple to a pump;
   wherein the first isolation valve is operatively coupled between the purge valve and the liquid flow meter.

2. The valve arrangement of claim 1 further comprising a heater coupled to at least one of the processing liquid path, the first and the second isolation valves and the pump valve and adapted to heat the at least one of the processing liquid path, the first and the second isolation valves and the pump valve.

3. A valve arrangement adapted to purge a processing liquid path comprising:
   a processing liquid path adapted to transport processing liquid between a source of the processing liquid and a liquid flow meter;
   a first isolation valve located adjacent an upstream side of the flow meter and forming a first part of the processing liquid path and wherein the first isolation valve comprises:
      a first section;
      a second section for locating between the first section and the liquid flow meter; and
      an isolation mechanism located between the first and the second sections and having an open position for allowing the flow of processing liquid between the first and the second sections and a closed position for preventing the flow of processing liquid between the first and the second sections;
   a second isolation valve located upstream from the first isolation valve and forming a second part of the processing liquid path and wherein the second isolation valve comprises:
      a first section;
      a second section for locating between the first section and the source of processing liquid; and
      an isolation mechanism located between the first and the second sections and having an open position for allowing the flow of processing liquid between the first and the second sections and a closed position for preventing the flow of processing liquid between the first and the second sections;
   a purge valve operatively coupled to the processing liquid path between the first and the second isolation valves and adapted to operatively couple to a source of purging gas;
   wherein the purge valve comprises:
      a first section operatively coupled to the processing liquid path between the isolation mechanisms of the first and the second isolation valves;
      a second section for operatively coupling to a source of purging gas; and
      an isolation mechanism located between the first and the second sections and having an open position for allowing the flow of purging gas between the first and the second sections and a closed position for preventing the flow of purging gas between the first and the second sections;
   a pump valve operatively coupled to the processing liquid path between the first and the second isolation valves and adapted to operatively couple to a pump;
   wherein the pump valve comprises:
      a first section operatively coupled to the processing liquid path between the isolation mechanisms of the first and the second isolation valves;
      a second section for operatively coupling to a pump; and
      an isolation mechanism located between the first and the second sections and having an open position for allowing pumping of the processing liquid path and a closed position for preventing pumping of the processing liquid path.

4. The valve arrangement of claim 3 wherein the first section of the first isolation valve has a smaller wetting perimeter than the second section of the first isolation valve and wherein the first section of the second isolation valve has a smaller wetting perimeter than the second section of the second isolation valve.

5. The valve arrangement of claim 4 wherein the first section of the purge valve has a smaller wetting perimeter than the second section of the purge valve and wherein the first section of the pump valve has a smaller wetting perimeter than the second section of the pump valve.

6. A processing liquid delivery system comprising:
the valve arrangement of claim 3;
a source of processing liquid operatively coupled to the second section of the second isolation valve;
a liquid flow meter operatively coupled to the second section of the first isolation valve;
a source of purging gas operatively coupled to the second section of the purge valve; and
a pump operatively coupled to the second section of the pump valve.

7. The processing liquid delivery system of claim 6 wherein the source of processing liquid comprises a source of metal-organic.

8. The processing liquid delivery system of claim 7 wherein the source of processing liquid comprises a source of TDMAT.

9. The processing liquid delivery system of claim 6 further comprises an injection valve operatively coupled to the liquid flow meter.

10. The processing liquid delivery system of claim 6 wherein the source of purging gas comprises a source of non-reactive gas.

11. The processing liquid delivery system of claim 10 wherein the source of purging gas comprises a source of nitrogen gas.

12. The processing liquid delivery system of claim 6 further comprising a controller operatively coupled to the first isolation valve, the second isolation valve, the purge valve and the pump valve and programmed for:
  (a) closing the first and the second isolation valves so as to isolate a portion of the processing liquid path;
  (b) opening the purge valve and the pump valve so as to purge the isolated portion of the processing liquid path with the purging gas from the purging gas source; and
  (c) closing the purge valve so as to pump processing liquid and purging gas from the isolated portion of the processing liquid path.

13. The processing liquid delivery system of claim 12 wherein the controller is further programmed for:
  repeating (b) and (c) until the isolated portion of the processing liquid path is sufficiently purged of processing liquid.

14. A method of purging a processing liquid from a processing liquid path comprising:
  (a) isolating a portion of a processing liquid path located between a source of processing liquid and a liquid flow meter via closing a plurality of isolation valves located between the source of processing liquid and the liquid flow meter;
  (b) purging the isolated portion of the processing liquid path with a purging gas; and
  (c) pumping processing liquid and purging gas from the isolated portion of the processing liquid path.

15. The method of claim 14 further comprising repeating (b) and (c) until the isolated portion of the processing liquid path is sufficiently purged of processing liquid.

16. The method of claim 14 further comprising:
  (d) imparting energy to the processing liquid within the processing liquid path to increase desorption thereof during purging and pumping of the isolated portion of the processing liquid path.

17. The method of claim 16 wherein imparting energy to the processing liquid comprises heating the plurality of isolation valves and the isolated portion of the processing liquid path.

18. The method of claim 14 wherein isolating a portion of a processing liquid path comprises:
  providing a first isolation valve at a first location along the processing liquid path, the first isolation valve having an open and a closed position;
  closing the first isolation valve;
  providing a second isolation valve at a second location along the processing liquid path, the second isolation valve having an open and a closed position; and
  closing the second isolation valve.

19. The method of claim 14 wherein purging the isolated portion of the processing liquid path with a purging gas comprises purging the isolated portion of the processing liquid path with a non-reactive gas.

20. The method of claim 14 wherein pumping processing liquid and purging gas from the isolated portion of the processing liquid path comprises:
  providing a pump;
  providing a pump valve having an open and a closed position;
  operatively coupling the pump valve to the pump and to the isolated portion of the processing liquid path; and
  opening the pump valve so as to pump the isolated portion of the processing liquid path.

21. The method of claim 20 wherein purging the isolated portion of the processing liquid path with a purging gas comprises:
  providing a source of purging gas;
  providing a purge valve having an open and a closed position;
  operatively coupling the purge valve to the source of purging gas and to the isolated portion of the processing liquid path; and
  opening the purge valve and the pump valve so as to purge the isolated portion of the processing liquid path with purging gas.

22. A method of replacing a dysfunctional injection valve operatively coupled to a source of processing liquid via a processing liquid path and a liquid flow meter located upstream from the dysfunctional injection valve, comprising:
  providing a first isolation valve along the processing liquid path at a first location between the source of processing liquid and the liquid flow meter and adjacent an upstream side of the liquid flow meter, the first isolation valve having an open and a closed position;
  providing a second isolation valve along the processing liquid path at a second location between the source of processing liquid and the first location and upstream from the first location, the second isolation valve having an open and a closed position;
  providing a source of purging gas;
  providing a purge valve;
  operatively coupling the purge valve to the source of purging gas and to the processing liquid path at a third location between the first and the second locations;
  providing a pump;
  providing a pump valve;
  operatively coupling the pump valve to the pump and to the processing liquid path at a fourth location between the first and the second locations;
  closing the first and the second isolation valves so as to isolate a portion of the processing liquid path;

purging the isolated portion of the processing liquid path via the source of purging gas and the pump; and removing the first isolation valve, the liquid flow meter and the dysfunctional injection valve as a unit.

23. The method of claim 22 wherein purging the processing liquid path comprises:

opening the purge valve and the pump valve so as to purge the isolated portion of the processing liquid path; and closing the purge valve so as to pump the isolated portion of the processing liquid path.

24. The method of claim 22 further comprising:

replacing the first isolation valve, the liquid flow meter and the dysfunctional injection valve with a new first isolation valve, a new liquid flow meter and a new injection valve.

25. The method of claim 24 further comprising:

purging the isolated portion of the processing liquid path between the new first isolation valve and the second isolation valve prior to introducing processing liquid thereto.

26. A method of replacing a component operatively coupled to a processing liquid path comprising:

providing at first isolation valve along the processing liquid path at a first location adjacent to and downstream from the component, the first isolation valve having an open and a closed position;

providing a second isolation valve along the processing liquid path at a second location downstream from the first location, the second isolation valve having an open and closed position;

providing a source of purging gas;

providing a purge valve;

operatively coupling the purge valve to the source of purging gas and to the processing liquid path at a third location between the first and the second locations;

providing a pump;

providing a pump valve;

operatively coupling the pump valve to the pump and to the processing liquid path at a fourth location between the first and the second locations;

closing the first and the second isolation valves so as to isolate a portion of the processing liquid path;

purging the isolated portion of the processing liquid path via the source of purging gas and the pump; and removing the first isolation valve and the component as a unit.

27. The method of claim 26 wherein purging the processing liquid path comprises:

opening the purge valve and the pump valve so as to purge the isolated portion of the processing liquid path; and closing the purge valve so as to pump the isolated portion of the processing liquid path.

* * * * *